United States Patent
Zhou et al.

(10) Patent No.: US 12,430,837 B2
(45) Date of Patent: Sep. 30, 2025

(54) GRAPHICS RENDERING METHOD AND APPARATUS, AND STORAGE MEDIUM

(71) Applicant: Beijing Zitiao Network Technology Co., Ltd., Beijing (CN)

(72) Inventors: Chao Zhou, Beijing (CN); Jie Wen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/928,813

(22) PCT Filed: Sep. 30, 2022

(86) PCT No.: PCT/CN2022/123578
§ 371 (c)(1),
(2) Date: Nov. 30, 2022

(87) PCT Pub. No.: WO2023/173728
PCT Pub. Date: Sep. 21, 2023

(65) Prior Publication Data
US 2024/0135624 A1    Apr. 25, 2024
US 2024/0233237 A9    Jul. 11, 2024

(30) Foreign Application Priority Data

Mar. 16, 2022    (CN) .......................... 202210260733.3

(51) Int. Cl.
G06T 15/00    (2011.01)
(52) U.S. Cl.
CPC ........ G06T 15/005 (2013.01); *G06T 2200/04* (2013.01)
(58) Field of Classification Search
None
See application file for complete search history.

(56) References Cited

U.S. PATENT DOCUMENTS 9,836,806 B1    12/2017    Lundin et al.
2015/0206269 A1    7/2015    Qin et al.
(Continued)

FOREIGN PATENT DOCUMENTS

CN    104239053 A    12/2014
CN    106681706 A    5/2017
(Continued)

OTHER PUBLICATIONS

European Patent Office, Extended European Search Report Issued in Application No. 22808576.7, Jan. 26, 2024, Germany, 9 pages.
(Continued)

*Primary Examiner* — Tapas Mazumder
(74) *Attorney, Agent, or Firm* — Alleman Hall & Tuttle LLP

(57) ABSTRACT

The present disclosure provides a graphics rendering method and apparatus, and a storage medium. In the method, a to-be-rendered graphic is determined, then an offset value and a size of a vertex filleted corner of a corresponding to-be-processed mask are determined based on a progress value of the to-be-rendered graphic, where the to-be-rendered graphic includes one or more vertex filleted corners, so that graphics rendering is performed on a UI based on the offset value and the size of the vertex filleted corner of the to-be-processed mask, thereby realizing the rendering of a graphic including a vertex filleted corner. Moreover, a vertex filleted corner at which the to-be-processed mask intersects with the to-be-rendered graphic is considered when the graphics rendering is performed according to embodiments of the present disclosure.

20 Claims, 5 Drawing Sheets

(56) References Cited

U.S. PATENT DOCUMENTS

2019/0334845 A1    10/2019   Rieseberg
2023/0036516 A1*    2/2023   Liu ..................... G06F 16/957

FOREIGN PATENT DOCUMENTS

| | | | |
|---|---|---|---|
| CN | 103995771 | B |   12/2017 |
| CN | 104239053 | B |    3/2018 |
| CN | 109814970 | A * | 5/2019 |
| CN | 109901894 | A |    6/2019 |
| CN | 110716770 | A |    1/2020 |
| CN | 106990951 | B |    4/2020 |
| CN | 111402381 | A |    7/2020 |
| CN | 112306601 | A |    2/2021 |
| CN | 112433724 | A |    3/2021 |
| CN | 113315985 | A |    8/2021 |
| CN | 113553807 | A |   10/2021 |
| CN | 113612981 | A |   11/2021 |
| CN | 114627225 | A |    6/2022 |
| EP |   1840838 | A1 |  10/2007 |
| EP |   2639716 | A2 |   9/2013 |

OTHER PUBLICATIONS

ISA China National Intellectual Property Administration, International Search Report issued in PCT Application No. PCT/CN2022/123578, Dec. 19, 2022, WIPO, 13 pages.

European Patent Office, Communication pursuant to Article 94(3) EPC for European Application No. 22808576.7, mailed Oct. 17, 2024, 5 pages.

China National Intellectual Property Administration, Office Action and Search Report Issued in Application No. 202210260733.3, Feb. 19, 2025, 18 pages. Submitted with translation of Office Action.

Li, W., "Study on visualized schedule management system of engineering," Thesis for Masters in Engineering, Beijing Jiaotong University, Jun. 20, 2009, 76 pages, English abstract provided on p. 7.

China National Intellectual Property Administration, Office Action and Search Report Issued in Application No. 202210260733.3, Jul. 15, 2025, 10 pages.

* cited by examiner

GRAPHICS RENDERING METHOD AND APPARATUS, AND STORAGE MEDIUM

CROSS-REFERENCE TO RELATED APPLICATIONS

This application is a National Stage of International Application No. PCT/CN2022/123578, filed on Sep. 30, 2022, which claims the priority to Chinese patent application No. 202210260733.3 titled "GRAPHICS RENDERING METHOD AND APPARATUS, AND STORAGE MEDIUM" and filed with the China National Intellectual Property Administration on Mar. 16, 2022. The entire contents of both of the above applications are incorporated into this application by reference in their entities.

TECHNICAL FIELD

The present disclosure relates to information displaying technology, and in particular to a graphics rendering method and apparatus, and a storage medium.

BACKGROUND

With the development of software technologies, more and more personalized interfaces are provided to users. Generally, when a user uses an electronic device, he often encounter a graphics rendering situation. Taking rendering of a progress bar as an example, a user waits, for example, for run of a program to complete, or for a page to load successfully, and also, for example, in some live streaming platforms where a lottery function is provided, a user watches the live streaming and waits for a result of the lottery. In these cases, a user interface (User Interface, UI) provides a progress bar to indicate the progression of the event.

In related technologies, graphics rendering is usually used to render a graphic with a specific shape or regular style, such as the progress bar above, therefore the rendering method is mainly for a foreground bar with a specific shape or a regular style.

However, there are various styles of to-be-rendered graphics, but existing graphics rendering methods cannot cover all cases. If the to-be-rendered graphic includes a vertex filleted corner and also has effect such as border (or edge) highlighting, the graphic cannot be solved by the existing graphics rendering methods.

SUMMARY

The present disclosure provides a graphics rendering method and apparatus, and a storage medium to solve the problem of the rendering of a graphic including a vertex filleted corner, while achieving the rendering of edge effects of the graphic.

In a first aspect, an embodiment of the present disclosure provides a graphics rendering method, including:
  displaying a to-be-rendered graphic on a UI, where the to-be-rendered graphic includes one or more vertex filleted corners;
  in response to a progress value of the to-be-rendered graphic, determining an offset value and a size of a vertex filleted corner of a to-be-processed mask corresponding to the to-be-rendered graphic, where the to-be-processed mask covers a border of the to-be-rendered graphic;
  rendering the to-be-rendered graphic on the user interface based on the offset value and the size of the vertex filleted corner of the to-be-processed mask.

In a possible implementation, where rendering the to-be-rendered graphic on the UI based on the offset value and the size of the vertex filleted corner of the to-be-processed mask includes:
  performing vertex coloring on the to-be-rendered graphic on the UI based on the offset value of the to-be-processed mask, and performing fragment coloring on remaining to-be-rendered pixel points on the UI based on the vertex colored to-be-rendered graphic and the size of the vertex filleted corner of the to-be-processed mask.

In a possible implementation, where performing the vertex coloring on the to-be-rendered graphic on the UI based on the offset value of the to-be-processed mask includes:
  converting a three-dimensional (three-dimensional, 3D) position of a to-be-rendered vertex from local space to mask space, based on a 3D pose of a node of the to-be-processed mask in world space;
  performing the vertex coloring on the to-be-rendered graphic on the UI according to the converted 3D position and the offset value of the to-be-processed mask.

In a possible implementation, where performing the fragment coloring on the remaining to-be-rendered pixel points on the UI based on the vertex colored to-be-rendered graphic and the size of the vertex filleted corner of the to-be-processed mask includes:
  determining, based on the vertex colored to-be-rendered graphic, whether the remaining to-be-rendered pixel points are outside a region of the to-be-processed mask;
  if a to-be-rendered pixel point i is not outside the region of the to-be-processed mask, determining whether the to-be-rendered pixel point i is outside a region of the vertex filleted corner of the to-be-processed mask, where the to-be-rendered pixel point i is any one of the remaining to-be-rendered pixel points, where i=1, . . . , n, and n is an integer, n is determined according to a number of the remaining to-be-rendered pixel points;
  if the to-be-rendered pixel point i is not outside the region of the vertex filleted corner of the to-be-processed mask, outputting an original color of the to-be-rendered pixel point i on the UI.

In a possible implementation, after determining whether the remaining to-be-rendered pixel points are outside the region of the to-be-processed mask, the method further includes:
  if the to-be-rendered pixel point i is outside the region of the to-be-processed mask, skipping coloring the to-be-rendered pixel point i or outputting the to-be-rendered pixel point i with a fully transparent color on the UI.

In a possible implementation, where determining whether the remaining to-be-rendered pixel points are outside the region of the to-be-processed mask includes:
  obtaining a two-dimensional coordinate of the to-be-rendered pixel point i according to a two-dimensional (two-dimensional, 2D) projection and rasterization of the to-be-rendered vertex;
  determining, based on the 2D coordinate of the to-be-rendered pixel point i, whether the to-be-rendered pixel point i is outside the region of the to-be-processed mask.

In a possible implementation, after determining whether the to-be-rendered pixel point i is outside the region of the vertex filleted corner of the to-be-processed mask, the method further includes:
  if the to-be-rendered pixel point i is outside the region of the vertex filleted corner of the to-be-processed mask, skipping coloring the to-be-rendered pixel point i or outputting the to-be-rendered pixel point i with a fully transparent color on the UI.

In a possible implementation, the to-be-rendered graphic includes four filleted corners and the to-be-processed mask is a rectangular mask which covers the border of the to-be-rendered graphic;
  where determining whether the to-be-rendered pixel point i is outside the region of the vertex filleted corner of the to-be-processed mask includes:
    obtaining a 2D coordinate of the to-be-rendered pixel point i according to a 2D projection and rasterization of the to-be-rendered vertex;
    determining, based on the 2D coordinate of the to-be-rendered pixel point i, a vertex filleted corner of the to-be-processed mask at a closest distance to the to-be-rendered pixel point i;
    calculating a circle center and an enclosing rectangle of the vertex filleted corner of the to-be-processed mask at the closest distance to the to-be-rendered pixel point i;
    determining whether the to-be-rendered pixel point i is outside the region of the vertex filleted corner of the to-be-processed mask, according to the circle center, the enclosing rectangle and the 2D coordinate of the to-be-rendered pixel point i.

In a possible implementation, the in response to the progress value of the to-be-rendered graphic, determining the offset value and the size of the vertex filleted corner of the to-be-processed mask corresponding to the to-be-rendered graphic includes:
  acquiring a length of the to-be-rendered graphic;
  calculating a product of the length and the progress value, and determining the calculated product as an offset value of the to-be-processed mask relative to a central point of the to-be-rendered graphic;
  determining, according to the progress value and the offset value, a size of a vertex filleted corner at which the to-be-processed mask intersects with the to-be-rendered graphic.

In a possible implementation, where determining, according to the progress value and the offset value, the size of the vertex filleted corner at which the to-be-processed mask intersects with the to-be-rendered graphic includes:
  determining, according to the progress value and a size of the border of the to-be-rendered graphic, a length of a progress line of the to-be-rendered graphic;
  determining, based on the length of the progress line and the offset value, the size of the vertex filleted corner at which the to-be-processed mask intersects with the to-be-rendered graphic.

In a second aspect, an embodiment of the present disclosure provides a graphics rendering apparatus, including:
  a graphics displaying module, configured to display a to-be-rendered graphic on a UI, where the to-be-rendered graphic comprises one or more vertex filleted corners;
  a mask processing module, configured to: in response to a progress value of the to-be-rendered graphic, determine an offset value and a size of a vertex filleted corner of a to-be-processed mask corresponding to the to-be-rendered graphic, where the to-be-processed mask covers a border of the to-be-rendered graphic;
  a graphics rendering module, configured to render the to-be-rendered graphic on the UI based on the offset value and the size of the vertex filleted corner of the to-be-processed mask.

In a possible implementation, the graphics rendering module is specifically configured to:
  perform vertex coloring on the to-be-rendered graphic on the UI based on the offset value of the to-be-processed mask, and perform fragment coloring on remaining to-be-rendered pixel points on the UI based on the vertex colored to-be-rendered graphic and the size of the vertex filleted corner of the to-be-processed mask.

In a possible implementation, the graphics rendering module is specifically configured to:
  convert a 3D position of a to-be-rendered vertex from local space to mask space, based on a 3D pose of a node of the to-be-processed mask in world space;
  perform the vertex coloring on the to-be-rendered graphic on the UI according to the converted 3D position and the offset value of the to-be-processed mask.

In a possible implementation, the graphics rendering module is specifically configured to:
  determine, based on the vertex colored to-be-rendered graphic, whether the remaining to-be-rendered pixel points are outside a region of the to-be-processed mask;
  if a to-be-rendered pixel point i is not outside the region of the to-be-processed mask, determine whether the to-be-rendered pixel point i is outside a region of the vertex filleted corner of the to-be-processed mask, where the to-be-rendered pixel point i is any one of the remaining to-be-rendered pixel points, where i=1, . . . , n, and n is an integer, n is determined according to a number of the remaining to-be-rendered pixel points;
  if the to-be-rendered pixel point i is not outside the region of the vertex filleted corner of the to-be-processed mask, output an original color of the to-be-rendered pixel point i on the UI.

In a possible implementation, the graphics rendering module is further configured to:
  if the to-be-rendered pixel point i is outside the region of the to-be-processed mask, skip coloring the to-be-rendered pixel point i or output the to-be-rendered pixel point i with a fully transparent color on the UI.

In a possible implementation, the graphics rendering module is specifically configured to:
  obtain a 2D coordinate of the to-be-rendered pixel point i according to a 2D projection and rasterization of the to-be-rendered vertex;
  determine, based on the 2D coordinate of the to-be-rendered pixel point i, whether the to-be-rendered pixel point i is outside the region of the to-be-processed mask.

In a possible implementation, the graphics rendering module is further configured to:
  if the to-be-rendered pixel point i is outside the region of the vertex filleted corner of the to-be-processed mask, skip coloring the to-be-rendered pixel point i or output the to-be-rendered pixel point i with a fully transparent color on the UI.

In a possible implementation, the to-be-rendered graphic includes four filleted corners and the to-be-processed mask is a rectangular mask which covers the border of the to-be-rendered graphic; and the graphics rendering module is specifically configured to:
obtain a 2D coordinate of the to-be-rendered pixel point i according to a 2D projection and rasterization of the to-be-rendered vertex;
determine, based on the 2D coordinate of the to-be-rendered pixel point i, a vertex filleted corner of the to-be-processed mask at a closest distance to the to-be-rendered pixel point i;
calculate a circle center and an enclosing rectangle of the vertex filleted corner of the to-be-processed mask at the closest distance to the to-be-rendered pixel point i;
determine whether the to-be-rendered pixel point i is outside the region of the vertex filleted corner of the to-be-processed mask, according to the circle center, the enclosing rectangle and the 2D coordinate of the to-be-rendered pixel point i.

In a possible implementation, the mask processing module is specifically configured to:
acquire a length of the to-be-rendered graphic;
calculate a product of the length and the progress value, and determine the calculated product as an offset value of the to-be-processed mask relative to a central point of the to-be-rendered graphic;
determine, according to the progress value and the offset value, a size of a vertex filleted corner at which the to-be-processed mask intersects with the to-be-rendered graphic.

In a possible implementation, the mask processing module is specifically configured to:
determine, according to the progress value and a size of the border of the to-be-rendered graphic, a length of a progress line of the to-be-rendered graphic;
determine, based on the length of the progress line and the offset value, the size of the vertex filleted corner at which the to-be-processed mask intersects with the to-be-rendered graphics.

In a third aspect, an embodiment of the present disclosure provides a graphics rendering device, including:
a processor;
a memory; and
a computer program;
where the computer program is stored in the memory and is configured to be executed by the processor, and the computer program includes an instruction for executing the method according to the first aspect.

In a fourth aspect, an embodiment of the present disclosure provides a computer readable storage medium, where the computer-readable storage medium has a computer program stored thereon, and the computer program causing a server to execute the method according to the first aspect and any possible designs of the first aspect.

In a fifth aspect, an embodiment of the present disclosure provides a computer program product including a computer instruction, when the computer instruction is executed by a processor, the method according to the first aspect and any possible designs of the first aspect is implemented.

In a sixth aspect, an embodiment of the present disclosure further provides a computer program, when the computer program runs on a computer, the computer is enabled to execute the method according to the first aspect and any possible designs of the first aspect.

Embodiments of the present disclosure provide a graphics rendering method and apparatus, and a storage medium. In the method, a to-be-rendered graphic is determined, then an offset value and a size of a vertex filleted corner of a corresponding to-be-processed mask are determined based on a progress value of the to-be-rendered graphic, where the to-be-rendered graphic includes one or more vertex filleted corners and the to-be-processed mask covers a border of the to-be-rendered graphic, so that graphics rendering is performed on a UI based on the offset value and the size of the vertex filleted corner of the to-be-processed mask, thereby realizing the rendering of a graphic including a vertex filleted corner. Moreover, a vertex filleted corner at which the to-be-processed mask intersects with the to-be-rendered graphic is considered when the graphics rendering is performed according to embodiments of the present disclosure, thereby realizing the rendering of edge effects of the to-be-rendered graphic, such as the rendering of effects such as border (or edge) highlighting of the to-be-rendered graphic, and thereby enhancing the texture of the UI and the richness of the rendering effects.

BRIEF DESCRIPTION OF DRAWINGS

In order to describe the technical solutions in the embodiments of the present disclosure or prior art more clearly, in the following, drawings that need to be used in the description of the embodiments or prior art will be introduced briefly. Obviously, the drawings described below are merely some embodiments of the present disclosure, and for those of skilled in the art, other drawings can be obtained according to these drawings without paying creative efforts.

DESCRIPTION OF EMBODIMENTS

The technical solutions in the embodiments of the present disclosure will be described as follows clearly and completely in conjunction with accompanying drawings in the embodiments of the present disclosure. Apparently, the described embodiments are merely a part rather than all of the embodiments of the present disclosure. Based on the embodiments in the present disclosure, all the other embodiments acquired by those skilled in the art without delivering creative efforts shall fall into the protection scope of the present disclosure.

The terms "first", "second", "third", and "fourth" in the specification and claims of the present disclosure and the accompanying drawings above, if present, are used to distinguish similar objects and need not be used to describe a particular order or sequence. It should be understood that the data so used is interchangeable where appropriate, so that embodiments of the present disclosure described herein can be implemented in an order other than those illustrated or described herein. In addition, the terms "include" and "have", and any variations thereof, are intended to cover non-exclusive inclusion. For example, a process, a method, a system, a product, or an apparatus including a series of steps or units, needs not be limited to those steps or units that are clearly listed, but may include other steps or units that are not clearly listed or that are inherent to the process, method, product, or device.

In related technology, a computer, a cell phone, and other devices often encounter graphics rendering when processing tasks. Taking rendering of a progress bar as an example, when the device transfers a file and evaluates system performance, a UI typically uses a progress bar to display the progress of the task being processed.

Figure 1:
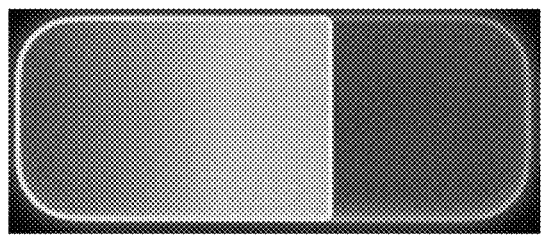
FIG. 1 is a schematic diagram of a foreground bar according to an embodiment of the present disclosure.

The graphics rendering is usually used to render a graphic with a specific shape or regular style. Taking the rendering of a progress bar above as an example, the progress bar is a common UI, generally including a background bar and a foreground bar displaying the current progress, and the rendering methods mainly differ in the foreground bar, therefore the existing rendering methods are mainly for a foreground bar with a specific pattern or a regular style. However, there are various styles of to-be-rendered graphics, such as various styles of the progress bar UI, but the existing rendering methods cannot cover all cases. For example, as shown in FIG. 1, a foreground bar includes four vertex filleted corners, the four vertex filleted corners are filleted corners when the progress is at the ends, and are right angles when the progress is in the middle, and the foreground bar also has effects such as border (or edge) highlighting. The rendering of the foreground bar cannot be realized by the existing rendering methods.

Therefore, an embodiment of the present disclosure proposes a graphics rendering method, where an offset value and a size of a vertex filleted corner of a corresponding to-be-processed mask are determined based on a progress value of a graphic, where the graphic includes one or more vertex filleted corners, so that graphics rendering is performed on a UI based on the offset value and the size of the vertex filleted corner of the to-be-processed mask, thereby realizing the rendering of a graphic including a vertex filleted corner. Moreover, in the embodiment of the present disclosure, the graphics rendering is performed by considering a vertex filleted corner at which the to-be-processed mask intersects with the graphic, thereby realizing the rendering of edge effects of the graphic, such as the rendering of effects such as border (or edge) highlighting of the graphic.

Figure 2:
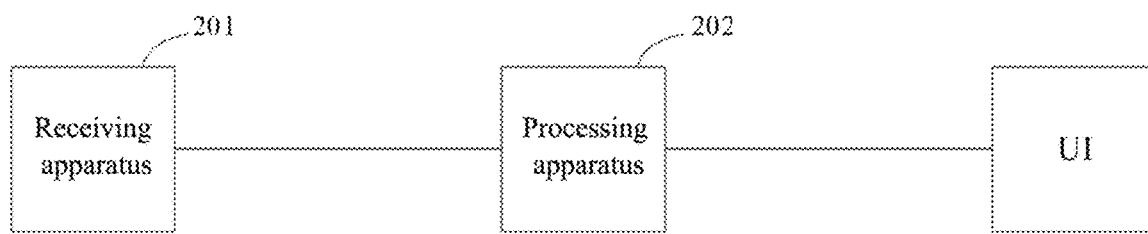
FIG. 2 is a schematic diagram of an architecture of a graphics rendering system according to an embodiment of the present disclosure.

In a specific implementation, the graphics rendering method provided by the embodiment of the present disclosure can be applied in a graphics rendering system as shown in FIG. 1. In FIG. 2, the graphics rendering system architecture may include a receiving apparatus 201 and a processing apparatus 202.

In a specific implementation, the receiving apparatus 201 may be an input/output interface or a communication interface that may be configured to receive a to-be-rendered graphic, etc.

The processing apparatus 202 can acquire, through the above-mentioned receiving apparatus 201, a to-be-rendered graphic which includes one or more vertex filleted corners, and then, determine an offset value and a size of a vertex filleted corner of a corresponding to-be-processed mask based on a progress value of the graphic, and finally perform, based on the above-mentioned offset value and the size of the vertex filleted corner of the to-be-processed mask, graphics rendering on a UI, thereby realizing the rendering of a graphic including a vertex filleted corner. Moreover, a vertex filleted corner at which the to-be-processed mask intersects with the graphic is considered when the processing apparatus 202 performs the graphics rendering, thereby realizing the rendering of edge effects of the graphic, such as the rendering of effects such as border (or edge) highlighting of the graphic.

The UI displays the to-be-rendered graphic after rendering, so that a user is kept informed of the relevant progress in time.

It should be understood that the above processing apparatus can be implemented by means of a processor reading instructions from a memory and executing the instructions, or by means of a chip circuit.

The above system is only an illustrative system, and the specific implementation can be set according to the application requirement.

In addition, the system architecture described in the embodiment of the present disclosure is intended to illustrate the technical solution of the embodiments of the present disclosure more clearly and does not constitute a limitation to the technical solutions provided by the embodiments of the present disclosure. It is known to those skilled in the art that, with evolution of the system architecture and emergence of new business scenarios, the technical solutions provided by the embodiments of the present disclosure are equally applicable to similar technical problems.

The technical solutions of the present disclosure are described below by taking several embodiments as examples, and the same or similar concepts or processes may not be repeated in some embodiments.

Figure 3:
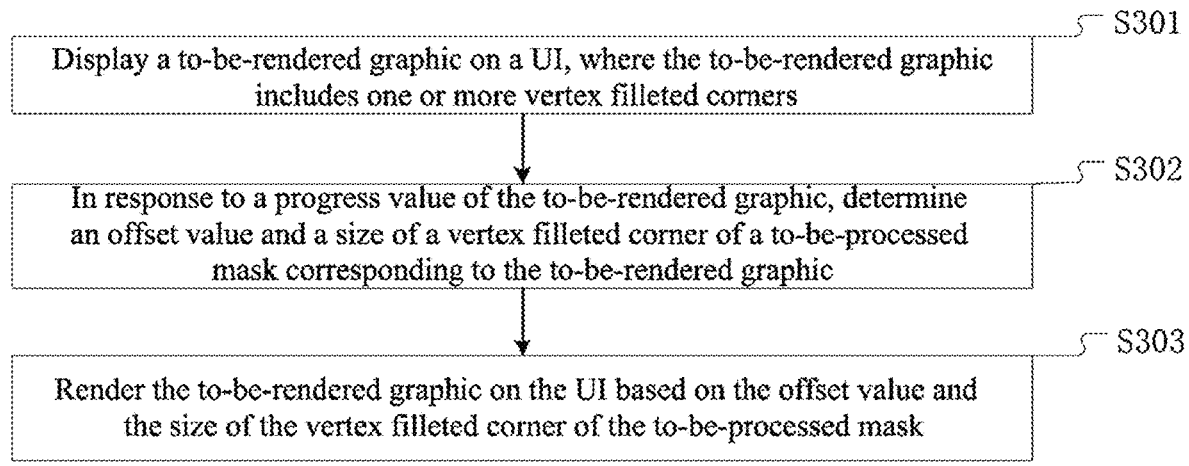
FIG. 3 is a schematic flowchart of a graphics rendering method according to an embodiment of the present disclosure.

FIG. 3 is a schematic flowchart of a graphics rendering method according to an embodiment of the present disclosure. The executive entity of the embodiment is the processing apparatus in FIG. 2 as an example, and the specific executive entity can be determined according to the actual application scenario, which is not particularly limited by the embodiments of the present disclosure. As shown in FIG. 3, the graphics rendering method according to the embodiment of the present disclosure may include the following steps:

S301: displaying a to-be-rendered graphic on a UI, where the to-be-rendered graphic includes one or more vertex filleted corners.

The to-be-rendered graphic includes one or more vertex filleted corners, and the to-be-rendered graphic can be a foreground bar.

In an embodiment of the present disclosure, the above processing apparatus may display the to-be-rendered graphic on the UI after acquiring the to-be-rendered graphic, and then can obtain a to-be-processed mask corresponding to the above to-be-rendered graphic. The shape of the mask may be determined according to the shape of the to-be-rendered graphic. For example, if the to-be-rendered graphic is in shape of a strip, the mask may be a rectangular mask.

S302: in response to a progress value of the to-be-rendered graphic, determining an offset value and a size of a vertex filleted corner of the to-be-processed mask corresponding to the to-be-rendered graphic.

Here, the to-be-processed mask covers a border of the to-be-rendered graphic. Here the term "cover" can be understood as: the above-mentioned to-be-processed mask is set on the above-mentioned to-be-rendered graphic, and the size of the to-be-processed mask is greater than or equal to the size of the border of the to-be-rendered graphic.

The offset value may be the offset value of the to-be-processed mask relative to a central point of the to-be-rendered graphic, and the size of the vertex filleted corner may be a size of a vertex filleted corner at which the to-be-processed mask intersects with the to-be-rendered graphic. The processing apparatus can acquire a length of the to-be-rendered graphic, and then calculate a product of the length and the progress value, and determine the calculated product as the offset value of the to-be-processed mask relative to the central point of the to-be-rendered graphic, which is simple and convenient and ensures proper follow-up. If the processing apparatus acquires the length of the to-be-rendered graphic as 300 and the progress value as 60%, the product of the length and the progress value is calculated to be 180, and thus, the offset value of the to-be-processed mask relative to the central point of the to-be-rendered graphic is determined to be 180.

Further, the processing apparatus, after determining the offset value of the to-be-processed mask relative to the central point of the to-be-rendered graphic, may also determine the size of the vertex filleted corner at which the to-be-processed mask intersects with the to-be-rendered graphic according to the above progress value and the offset value, for example, determine a length of a progress line of the to-be-rendered graphic according to the progress value and the size of the border of the above to-be-rendered graphic. Thus, the processing apparatus can determine the size of the vertex filleted corner at which the to-be-processed mask intersects with the to-be-rendered graphic based on the length of the progress line and the offset value. Therefore, a vertex filleted corner at which the to-be-processed mask intersects with the graphic can be considered when the processing apparatus performs graphics rendering subsequently, thereby realizing the rendering of edge effects of the to-be-rendered graphic, such as the rendering of effects such as border (or edge) highlighting of the graphic.

Figure 4:
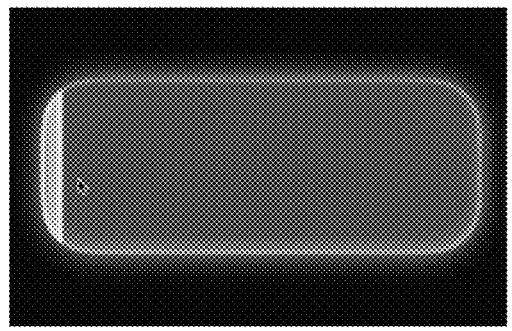
FIG. 4 is a schematic diagram of another foreground bar according to an embodiment of the present disclosure.

Illustratively, the processing apparatus can pre-store the correspondence between the length as well as the offset value of the progress line of the to-be-rendered graphic, and the size of the vertex filleted corner at which the to-be-processed mask intersects with the to-be-rendered graphic. As shown in FIG. 4, an example is taken where the above-mentioned to-be-rendered graphic is a foreground bar, the foreground bar includes four filleted corners. The processing apparatus can determine the length of the progress line of the foreground bar according to the progress value of the foreground bar and the size of the border of the foreground bar as shown in FIG. 4, and then can determine the size of the vertex filleted corner at which the to-be-processed mask intersects with the foreground bar based on the length of the progress line, the offset value of the foreground bar and the above correspondence, that is, determine sizes of the top left, top right, bottom left, and bottom right vertex filleted corners at which the to-be-processed mask intersect with the foreground bar in FIG. 4.

S303: rendering the to-be-rendered graphic on the UI based on the offset value and the size of the vertex filleted corner of the to-be-processed mask.

Illustratively, the above processing apparatus can render the graphic based on the offset value, the size of the vertex filleted corner and the to-be-processed mask, as well as a preset Entity node tree.

An example is taken where the to-be-processed mask is a rectangular mask covering the border of the to-be-rendered graphic, the above Entity node tree may include:

Volume Slider
  ProgressMask
    Border
  CornerMask
    Line

VolumeSlider responds to an interaction event and sets the progress value, and the script sets parameters of related child nodes (ProgressMask, CornerMask) according to the progress value to match the rendering effect of the progress bar under the progress value. ProgressMask mounts a Mask component and sets parameters to the mask is rendered in a certain way for a child node (Border), such as, rendering the mask in a fill mode. Here, the above Mask component includes a parameter Offset, which indicates an offset value of a mask relative to a central point of the to-be-rendered graphic. CornerMask mounts a Mask component and sets parameters so that the mask is rendered in a certain way for a child node (Line), such as, rendering the mask in a filleted corner mode. The Mask component includes parameters TopLeft/TopRight/BottomLeft/BottomRight, which indicate the sizes of the top left, top right, bottom left and bottom right vertex filleted corners at which the rectangular mask intersect with the to-be-rendered graphic.

In addition, a Mask component mounted in ProgressMask and a Mask component mounted in CornerMask can also include a parameter Inverted, which indicates whether to invert the mask (rendering inside the mask by default). The size of the rectangular mask can be determined by setting the size of the Transform2d component of the Mask component, so as to meet the application requirements in different application scenarios.

Here, when the processing apparatus performs the graphics rendering based on the offset value, the size of the vertex filleted corner and the to-be-processed mask, as well as a the preset Entity node tree, the processing apparatus can update the Mask components in the Entity node tree based on the offset value, the size of the vertex filleted corner and the to-be-processed mask, and set MaskDirty to be true, and then further update the child nodes under the Mask components, and when updating the child nodes under the Mask components, the processing apparatus can determine whether MaskDirty is true. If MaskDirty is true, it means that the Mask component has been updated, then the above processing apparatus can set a child node material mask uniform value, render the child node, that is, perform coloring in the rendering shader, and complete the mask logic, thereby realizing the rendering of the to-be-rendered graphic.

In the embodiment of the present disclosure, a to-be-rendered graphic is determined, an offset value and a size of a vertex filleted corner of a corresponding to-be-processed mask are determined based on a progress value of a to-be-rendered graphic, where the to-be-rendered graphic includes one or more vertex filleted corners, so that graphics rendering is performed on a UI based on the offset value and the size of the vertex filleted corner of the to-be-processed mask, thereby realizing the rendering of a graphic including a vertex filleted corner. Moreover, a vertex filleted corner at which the to-be-processed mask intersects with the to-be-rendered graphic is considered when the graphics rendering is performed according to the embodiment of the present disclosure, thereby realizing the rendering of edge effects of the to-be-rendered graphic, such as the rendering of effects such as border (or edge) highlighting of the to-be-rendered graphic, and thereby enhancing the texture of the UI and the richness of the rendering effects.

Figure 5:
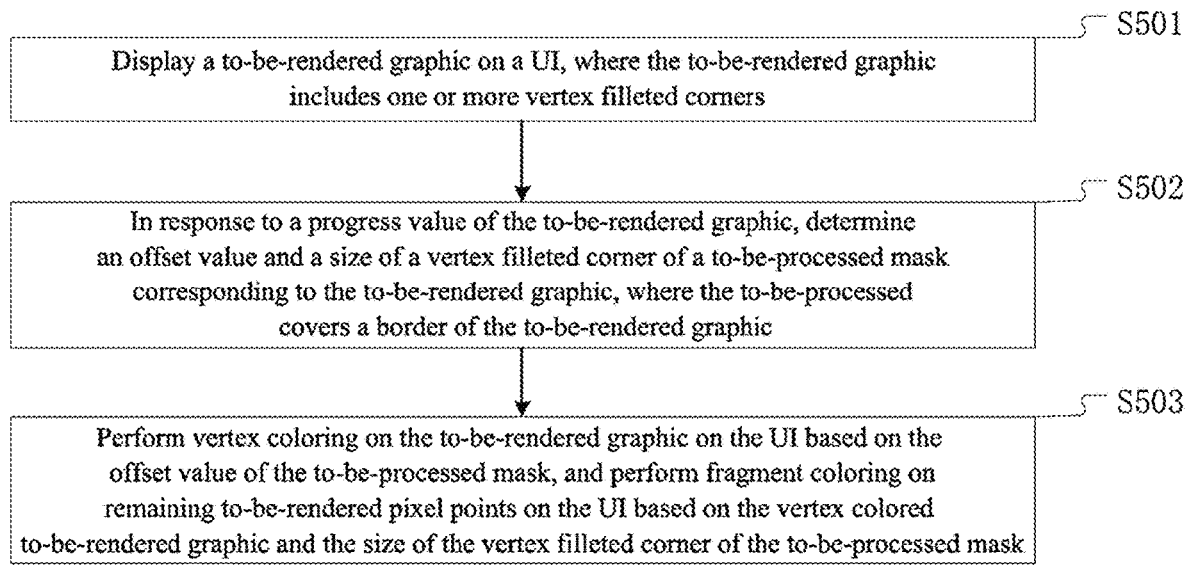
FIG. 5 is a schematic flowchart of another graphics rendering method according to an embodiment of the present disclosure.

In addition, when the processing apparatus performs the graphics rendering, for example, when during the rendering of the child node above, coloring is performed in the rendering shader and the masking logic is completed, it is considered that vertex coloring is performed on the graphic on the UI based on the offset value and the to-be-processed mask, and fragment coloring is performed on remaining to-be-rendered pixel points on the UI based on the vertex colored graphic and the size of the vertex filleted corner, to realize the rendering of the graphic including a vertex filleted corner, while enabling the rendered graphic have effects such as border (or edge) highlighting. FIG. 5 is a schematic flowchart of another graphics rendering method according to an embodiment of the present disclosure. As shown in FIG. 5, the method includes:

S501: displaying a to-be-rendered graphic on a UI, where the to-be-rendered graphic includes one or more vertex filleted corners.

S502: in response to a progress value of the to-be-rendered graphic, determining an offset value and a size of a vertex filleted corner of a to-be-processed mask corresponding to the to-be-rendered graphic, where the to-be-processed mask covers a border of the to-be-rendered graphic.

The steps S501-S502 are implemented in the same way as the above steps S301-S302, which will not be repeated here.

S503: performing vertex coloring on the to-be-rendered graphic on the UI based on the offset value of the to-be-processed mask, and performing fragment coloring on remaining to-be-rendered pixel points on the UI based on the vertex colored to-be-rendered graphic and the size of the vertex filleted corner of the to-be-processed mask.

Here, the processing apparatus can convert a 3D position of a to-be-rendered vertex from local space to mask space, based on a three-dimensional pose of a node of the to-be-processed mask in world space, and then, perform the vertex coloring processing according to the converted 3D position and the offset value, to realize the rendering of the vertex filleted corner in the graphic. The world space is to specify where the origin of the virtual 3D space is, such as point A. If a 3D cube is placed at the location of (2, 2, 2) in the world with a side length of 1, locations of the 8 points of the cube are (1, 1, 1), (1, 1, 3), (1, 3, 1), (1, 3, 3), (3, 1, 1) . . . . Each world space corresponds to a local space, such as the point (2, 2, 2) in the world space is the point (0, 0, 0) in the local space of the cube, so that in the local space, locations of the 8 points are (−1, −1, −1), (−1, −1, 1), (−1, 1, −1), (−1, 1, 1) . . . . In addition, the above mask space is the local space of the mask node.

Figure 6:
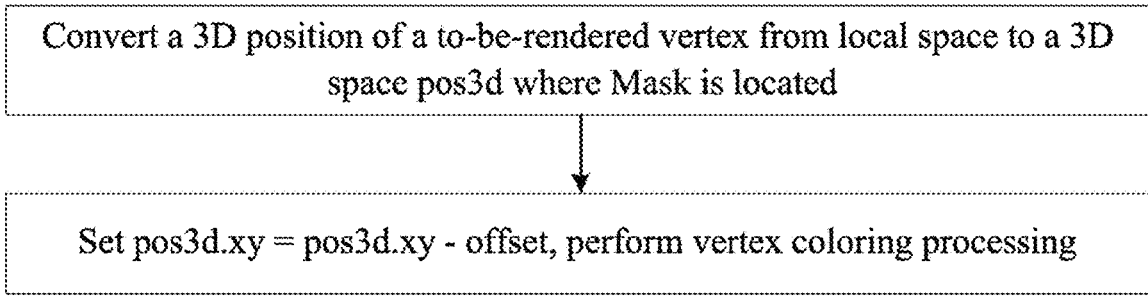
FIG. 6 is a schematic flowchart of vertex coloring according to an embodiment of the present disclosure.

Illustratively, as shown in FIG. 6, the processing apparatus may use the above Entity node tree to transform the three-dimensional position of the to-be-rendered vertex from the local space to the 3D space pos3d where Mask is located, and then set pos3d.xy=pos3d.xy offset, that is, perform the vertex coloring processing by taking the offset value into account.

In the embodiment of the present disclosure, when the processing apparatus performs the fragment coloring, the processing apparatus can determine whether remaining to-be-rendered pixel points are outside the region of the to-be-processed mask based on the vertex colored to-be-rendered graphic and the size of the vertex filleted corner of the to-be-processed mask. If a to-be-rendered pixel point i is not outside the region of the to-be-processed mask, the processing apparatus can further determine whether the to-be-rendered pixel point i is outside a region of the vertex filleted corner of the to-be-processed mask, where the to-be-rendered pixel point i is any one of the remaining to-be-rendered pixel points, where i=1, . . . , n, and n is an integer, n is determined according to the number of the remaining to-be-rendered pixel points; if the to-be-rendered pixel point i is not outside the region of the vertex filleted corner of the to-be-processed mask, the processing apparatus can output an original color of the to-be-rendered pixel point i on the UI.

If the to-be-rendered pixel point i is outside the region of the to-be-processed mask, the processing apparatus can skip coloring the to-be-rendered pixel point i or output the to-be-rendered pixel point i with a fully transparent color on the UI. Similarly, if the to-be-rendered pixel point i is outside the region of the vertex filleted corner of the to-be-processed mask, the processing apparatus can skip coloring the to-be-rendered pixel point i or output the to-be-rendered pixel point i with a fully transparent color on the UI.

In this way, the above processing apparatus can realize not only the rendering of the graphic including a vertex filleted corner but also the rendering of edge effects of the to-be-rendered graphic by the vertex coloring and the fragment coloring, thereby enhancing the texture of the UI and the richness of the rendering effects.

Here, the processing apparatus, when determining whether the remaining to-be-rendered pixel points are outside the region of the to-be-processed mask, can obtain the 2D coordinate of the to-be-rendered pixel point i (such as the pos3d.xy above) based on a 2D projection and rasterization of the to-be-rendered vertex, and then, based on the 2D coordinate of the to-be-rendered pixel point i, determine whether the to-be-rendered pixel point i is outside the region of the to-be-processed mask, thereby improving the accuracy of the determination result, and further improving the subsequent graphics rendering effect. The rasterization is a process of transforming a graphic element into a 2D image.

Figure 7:
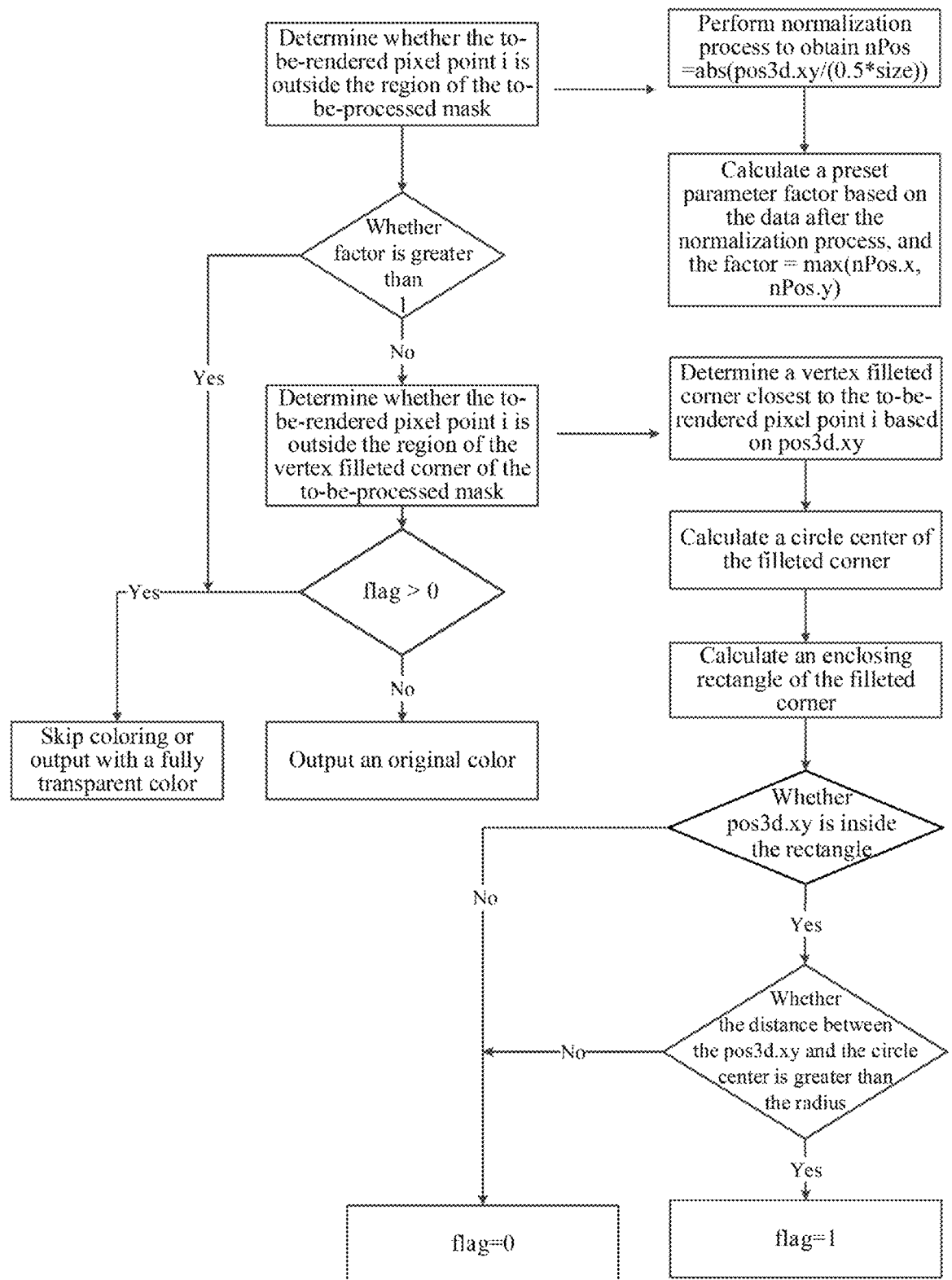
FIG. 7 is a schematic flowchart of fragment coloring according to an embodiment of the present disclosure.

Illustratively, as shown in FIG. 7, the above processing apparatus, after obtaining the 2D coordinate of the to-be-rendered pixel point i, may further normalize the 2D coordinate of the to-be-rendered pixel point i to facilitate the subsequent process, for example, determine whether the to-be-rendered pixel point i is outside the region of the to-be-processed mask based on the normalized data. The normalization process can be determined according to the actual situation, for example, the data after the normalization process is nPos=abs(pos3d.xy/(0.5*size)), here, abs( ) indicates taking an absolute value, size indicates a length of the to-be-rendered graphic, and nPos takes a value between −1 and 1. Taking the to-be-processed mask being a rectangular mask as an example, the processing apparatus, after normalizing the 2D coordinate of the to-be-rendered pixel point i, can determine whether the to-be-rendered pixel point i exceeds a length of the to-be-processed mask and determine whether the to-be-rendered pixel point i exceeds a width of the to-be-processed mask based on the normalized data. For example, the processing apparatus calculates a preset parameter factor, and factor=max(nPos.x, nPos.y), where nPos.x and nPos.y are determined according to nPos, and then the processing apparatus determines whether the factor is greater than 1. If the factor is greater than 1, it indicates that the to-be-rendered pixel point i is beyond the length of the to-be-processed mask, and/or the to-be-rendered pixel point i is beyond the width of the to-be-processed mask, thus indicates that the to-be-rendered pixel point i is outside the region of the to-be-processed mask. The determination result is relatively accurate, so that the above processing apparatus can skip coloring the to-be-rendered pixel point i or output the to-be-rendered pixel point i with a fully transparent color on the UI, otherwise, it indicates that the to-be-rendered pixel point i is not outside the region of the to-be-processed mask, the processing apparatus can output the original color of the to-be-rendered pixel point i on the UI, thereby improving the effect of the graphics rendering.

In addition, when the to-be-rendered graphic includes four filleted corners and the to-be-processed mask is a rectangular mask, the above processing apparatus, when judging whether the to-be-rendered pixel point i is outside the region of the vertex filleted corner of the to-be-processed mask, can first obtain the 2D coordinate of the to-be-rendered pixel point i according to the 2D projection and rasterization of the to-be-rendered vertex. The processing apparatus can then determine a vertex filleted corner of the to-be-processed mask at the closest distance to the to-be-rendered pixel point i based on the 2D coordinate of the to-be-rendered pixel point i, and calculate a circle center and an enclosing rectangle of the filleted corner, so that the processing apparatus can determine whether the to-be-rendered pixel point i is outside a region of the vertex filleted corner of the to-be-processed mask according to the circle center, the enclosing rectangle and the 2D coordinate of the to-be-rendered pixel point i. Therefore the determination result is relatively accurate, so that the rendering of the graphic including the vertex filleted corner can be better realized subsequently.

Exemplarily, as shown in FIG. 7, the processing apparatus can determine the vertex filleted corner of the to-be-processed mask that is closest to the to-be-rendered pixel point i based on pos3d.xy, and then calculate the circle center and the enclosing rectangle of the filleted corner. The processing apparatus can determine whether pos3d.xy is inside the rectangle, if not, set the preset parameter flag bit (flag)=0; if yes, further determine whether the distance between the pos3d.xy and the circle center is greater than the radius, if the distance is greater, set flag=1, if not, set flag=0. Thus, the processing apparatus can determine whether the to-be-rendered pixel point i is outside the region of the vertex filleted corner of the to-be-processed mask based on the value of the flag. If the flag >0, the to-be-rendered pixel point i is determined to be outside the region of the vertex filleted corner of the to-be-processed mask, thus improving the accuracy of the determination result, so that coloring of the to-be-rendered pixel point i is skipped or the to-be-rendered pixel point i is output with a fully transparent color on the UI. Otherwise, the to-be-rendered pixel point i is determined not to be outside the region of the vertex filleted corner of the to-be-processed mask, so that the original color of the to-be-rendered pixel point i is output on the UI, thereby realizing the rendering of the graphic including the vertex filleted corner better.

During the foreground rendering according to the embodiment of the present disclosure, the vertex coloring processing is performed based on the offset value, the size of the vertex filleted corner and the to-be-processed mask, and then, the fragment coloring process is performed on the remaining to-be-rendered pixel points based on the to-be-processed mask after the vertex coloring processing, thereby realizing the rendering of the graphic which is of the type "edge effect plus filleted corner", thereby improving the texture of the UI and the richness of the rendering effects.

In addition, when the to-be-rendered graphic is a progress bar, the processing apparatus can first determine the foreground bar and the background bar of the to-be-rendered graphic based on the to-be-rendered graphic, and then render the background bar by using a preset rendering method, and render the foreground bar by using the above graphics rendering method.

The preset rendering method can be a base map rendering or a 9-grid stretching rendering method. The above graphics rendering method is the graphics rendering method according to any of the preceding embodiments, reference can be made to the preceding embodiments, and details will not be repeated here.

Figure 8:
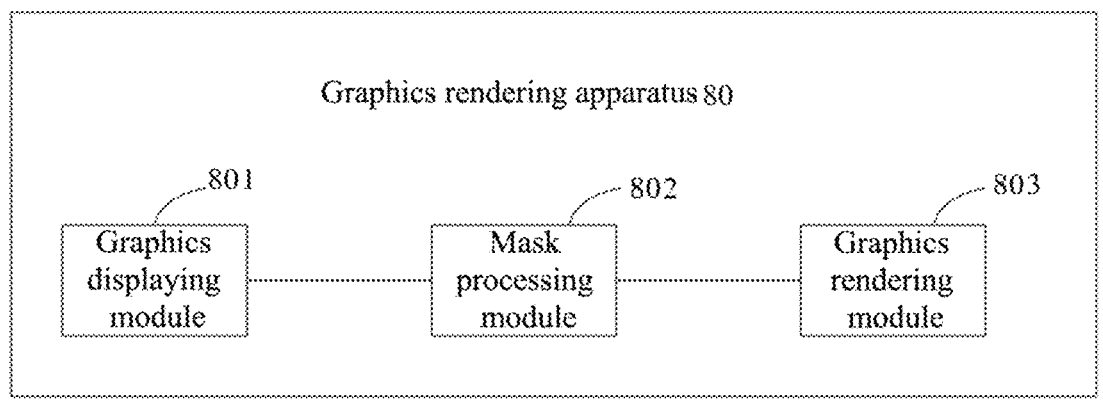
FIG. 8 is a schematic structural diagram of a graphics rendering apparatus according to an embodiment of the present disclosure.

Corresponding to the graphics rendering method of the above-described embodiments, FIG. 8 is a schematic structural diagram of a graphics rendering apparatus according to an embodiment of the present disclosure. For convenience of description, only the parts related to the embodiments of the present disclosure are shown. FIG. 8 is a schematic structural diagram of a graphics rendering apparatus according to an embodiment of the present disclosure. The graphics rendering apparatus 80 includes: a graphics displaying module 801, a mask processing module 802, and a graphics rendering module 803. The graphics rendering apparatus herein may be the processing apparatus itself as described above, or a chip or an integrated circuit that implements functions of the processing apparatus. It should be noted here that the division of the graphics displaying module, the mask processing module, and the graphics rendering module is only a logical functional division, and physically they can be integrated or independent.

In particular, the graphics displaying module 801 is configured to display a to-be-rendered graphic on a UI, where the to-be-rendered graphic includes one or more vertex filleted corners.

The mask processing module 802 is configured to: in response to a progress value of the to-be-rendered graphic, determine an offset value and a size of a vertex filleted corner of a to-be-processed mask corresponding to the to-be-rendered graphic, where the to-be-processed mask covers a border of the to-be-rendered graphic.

The graphics rendering module 803 is configured to render the to-be-rendered graphic on the UI based on the offset value and the size of the vertex filleted corner of the to-be-processed mask.

In a possible implementation, the graphics rendering module 803 is specifically configured to:
  perform vertex coloring on the to-be-rendered graphic on the UI based on the offset value of the to-be-processed mask, and perform fragment coloring on remaining to-be-rendered pixel points on the UI based on the vertex colored to-be-rendered graphic and the size of the vertex filleted corner of the to-be-processed mask.

In a possible implementation, the graphics rendering module 803 is specifically configured to:
  convert a 3D position of a to-be-rendered vertex from local space to mask space, based on a 3D pose of a node of the to-be-processed mask in world space;
  perform the vertex coloring on the to-be-rendered graphic on the UI according to the converted 3D position and the offset value of the to-be-processed mask.

In a possible implementation, the graphics rendering module 803 is specifically configured to:
  determine, based on the vertex colored to-be-rendered graphic, whether the remaining to-be-rendered pixel points are outside a region of the to-be-processed mask;
  if a to-be-rendered pixel point i is not outside the region of the to-be-processed mask, determine whether the to-be-rendered pixel point i is outside a region of the vertex filleted corner of the to-be-processed mask, where the to-be-rendered pixel point i is any one of the remaining to-be-rendered pixel points, where i=1, . . . , n, and n is an integer, n is determined according to a number of the remaining to-be-rendered pixel points;

if the to-be-rendered pixel point i is not outside the region of the vertex filleted corner of the to-be-processed mask, output an original color of the to-be-rendered pixel point i on the UI.

In a possible implementation, the graphics rendering module 803 is further configured to:

if the to-be-rendered pixel point i is outside the region of the to-be-processed mask, skip coloring the to-be-rendered pixel point i or output the to-be-rendered pixel point i with a fully transparent color on the UI.

In a possible implementation, the graphics rendering module 803 is specifically configured to:

obtain a 2D coordinate of the to-be-rendered pixel point i according to a 2D projection and rasterization of the to-be-rendered vertex;

determine, based on the 2D coordinate of the to-be-rendered pixel point i, whether the to-be-rendered pixel point i is outside the region of the to-be-processed mask.

In a possible implementation, the graphics rendering module 803 is further configured to:

if the to-be-rendered pixel point i is outside the region of the vertex filleted corner of the to-be-processed mask, skip coloring the to-be-rendered pixel point i or output the to-be-rendered pixel point i with a fully transparent color on the UI.

In a possible implementation, the to-be-rendered graphic includes four filleted corners and the to-be-processed mask is a rectangular mask which covers the border of the to-be-rendered graphic; and the graphics rendering module 803 is specifically configured to:

obtain a 2D coordinate of the to-be-rendered pixel point i according to a 2D projection and rasterization of the to-be-rendered vertex;

determine, based on the 2D coordinate of the to-be-rendered pixel point i, a vertex filleted corner of the to-be-rendered mask at a closest distance to the to-be-rendered pixel point i;

calculate a circle center and an enclosing rectangle of the vertex filleted corner of the to-be-processed mask at the closest distance to the to-be-rendered pixel point i;

determine whether the to-be-rendered pixel point i is outside the region of the vertex filleted corner of the to-be-processed mask, according to the circle center, the enclosing rectangle and the 2D coordinate of the to-be-rendered pixel point i.

In a possible implementation, the mask processing module 802 is specifically configured to:

acquire a length of the to-be-rendered graphic;

calculate a product of the length and the progress value, and determine the calculated product as an offset value of the to-be-processed mask relative to a central point of the to-be-rendered graphic;

determine, according to the progress value and the offset value, a size of a vertex filleted corner at which the to-be-processed mask intersects with the to-be-rendered graphic.

In a possible implementation, the mask processing module 802 is specifically configured to:

determine, according to the progress value and a size of the border of the to-be-rendered graphic, a length of a progress line of the to-be-rendered graphic;

determine, based on the length of the progress line and the offset value, the size of the vertex filleted corner at which the to-be-processed mask intersects with the to-be-rendered graphic.

In a possible implementation, the to-be-rendered graphic is a foreground bar.

The device provided in the embodiment of the present disclosure can be used to implement the technical solutions of the above method embodiments, and the implementation principles and technical effects thereof are similar, which will not be repeated here in the embodiment of the present disclosure.

Figure 9:
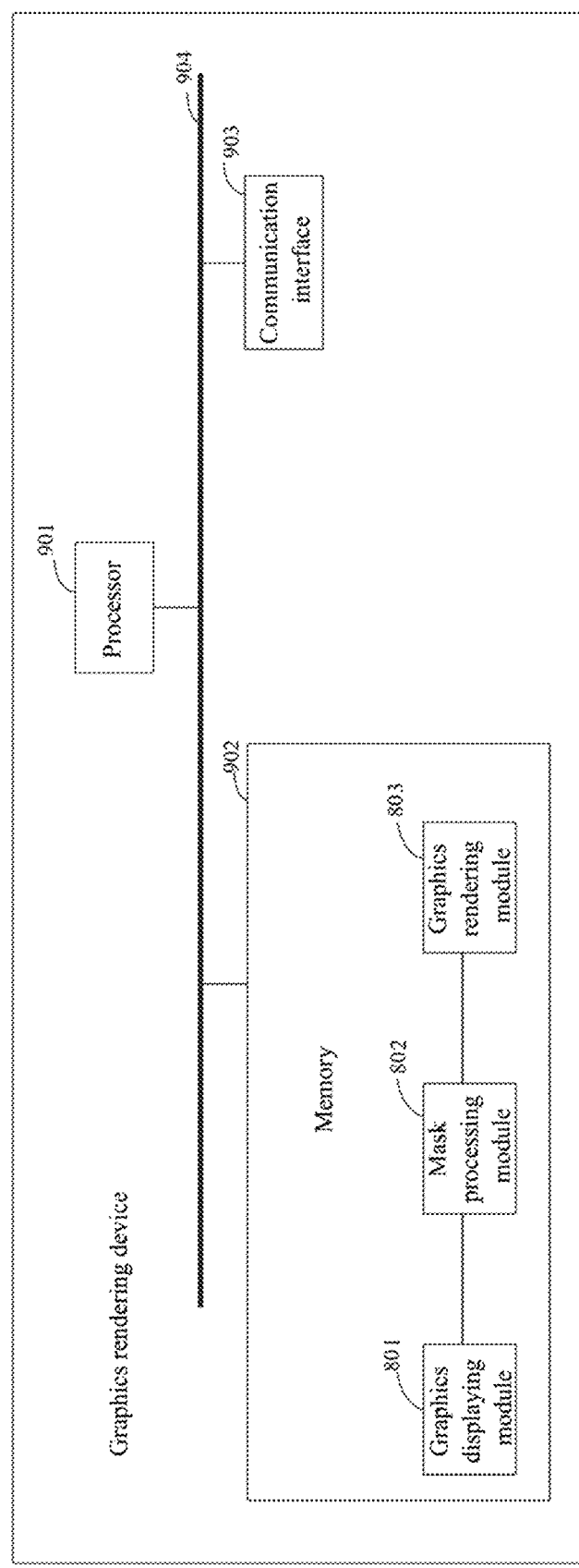
FIG. 9 is a basic hardware structural diagram of a graphics rendering device according to an embodiment of the present disclosure.

In a specific implementation, FIG. 9 schematically provides a schematic diagram of a possible basic hardware architecture of the graphics rendering device described in the present disclosure.

Referred to FIG. 9, the graphics rendering device includes at least one processor 901 and a communication interface 903. In a specific implementation, a memory 902 and a bus 904 may be included.

The number of the processor 901 in the graphics rendering device may be one or more, and FIG. 9 only illustrates one of the processors 901. In a specific implementation, the processor 901 may be a central processing unit (central processing unit, CPU), a graphics processing unit (graphics processing unit, GPU), or a digital signal processor (digital signal processor, DSP). If the graphics rendering device has a plurality of processors 901, the plurality of processors 901 may be of different types, or may be the same. In a specific implementation, the plurality of processors 901 of the graphics rendering device may also be integrated into a multi-core processor.

The memory 902 stores computer instructions and data; the memory 902 may store computer instructions and data required to implement the above-described graphics rendering method according to the present disclosure. For example, the memory 902 stores instructions for implementing the steps of the above-described graphics rendering method. The memory 902 may be any one or any combination of the following storage medium: a non-volatile memory (e.g., a read-only memory (Read-Only Memory, ROM), a solid state disk (Solid State Disk, SSD), a hard disk drive (Hard Disk Drive, HDD), an optical disk), a volatile memory.

The communication interface 903 may provide information input/output for the at least one processor. It may also include any one or any combination of the following devices: a network interface (e.g., Ethernet interface), a wireless network card, and other devices with network access capabilities.

In a specific implementation, the communication interface 903 may also be used for data communication between the graphics rendering device and other computing devices or terminals.

In a specific implementation, in FIG. 9, a bus 904 is illustrated with a thick line. The bus 904 may connect the processor 901 to the memory 902 and the communication interface 903. Thus, the processor 901 can access the memory 902 via the bus 904, and can also use the communication interface 903 to interact with other computing devices or terminals for data.

In the present disclosure, the graphics rendering device executes the computer instructions in the memory 902, so that the graphics rendering device can implement the above-mentioned graphics rendering method according to the present disclosure, or the graphics rendering device can deploy the above-mentioned graphics rendering device.

In terms of logical functional division, illustratively, as shown in FIG. 9, the memory 902 may include a graphics displaying module 801, a mask processing module 802, and a graphics rendering module 803. The inclusion herein relates only to the functions of the graphics displaying module, the mask processing module, and the graphics rendering module, respectively, that can be implemented when the instructions stored in the memory are executed, and is not limited to a physical structure.

The present disclosure provides a computer readable storage medium, the computer program product includes computer instructions, the computer instructions instruct a computing device to perform the above-mentioned graphics rendering method according to the present disclosure.

The present disclosure provides a computer program product including a computer instruction, when the computer instruction is executed by a processor, the above-mentioned graphics rendering method is implemented.

The present disclosure provides a computer program, when the computer program is executed by a computer, the computer is enabled to implement the above-mentioned graphics rendering method.

The present disclosure provides a chip including at least one processor and a communication interface, and the communication interface provides information input and/or output to the at least one processor. Further, the chip may further include at least one memory, and the memory is configured to store computer instructions. The at least one processor is configured to call and run the computer instructions to perform the above-mentioned graphics rendering method according to the present disclosure.

In several embodiments according to the present disclosure, it should be understood that the disclosed apparatus and method, may be implemented in other ways. For example, the embodiments of the apparatus described above are merely schematic. For example, the division of the units described, is only a logical functional division, and they can be divided in other ways in the actual implementation. For example, multiple units or components can be combined or can be integrated into another system, or some features can be ignored, or not be implemented. On the other hand, the mutual coupling, direct coupling or communication connection shown or discussed can be indirect coupling or communication connection through some interfaces, devices or units, which can be electrical, mechanical or in other forms.

The units illustrated as separate components may or may not be physically separated, and the components shown as units may or may not be physical units, i.e., they may be located in the same place or may be distributed to a plurality of network units. Some or all of these units may be selected according to practical needs to achieve the purpose of the solution of the present embodiment.

In addition, each functional unit in each embodiment of the present disclosure may be integrated in a single processing unit, or each unit may be physically present separately, or two or more units may be integrated in a single unit. The above integrated units can be implemented either in the form of hardware or in the form of hardware as well as software functional units.

What is claimed is:

1. A graphics rendering method, comprising:
    displaying a graphic on a user interface, wherein the graphic comprises one or more vertex filleted corners;
    in response to a progress value of the graphic, determining an offset value and a size of a vertex filleted corner of a mask corresponding to the graphic, wherein the mask covers a border of the graphic; and
    rendering the graphic on the user interface based on the offset value and the size of the vertex filleted corner of the mask.

2. The method according to claim 1, wherein rendering the graphic on the user interface based on the offset value and the size of the vertex filleted corner of the mask comprises:
    performing vertex coloring on the graphic on the user interface based on the offset value of the mask, and performing fragment coloring on remaining to-be-rendered pixel points on the user interface based on the vertex colored graphic and the size of the vertex filleted corner of the mask.

3. The method according to claim 2, wherein performing the vertex coloring on the graphic on the user interface based on the offset value of the mask comprises:
    converting a three-dimensional position of a vertex from local space to mask space, based on a three-dimensional pose of a node of the mask in world space; and
    performing the vertex coloring on the graphic on the user interface according to the converted three-dimensional position and the offset value of the mask.

4. The method according to claim 2, wherein performing the fragment coloring on the remaining to-be-rendered pixel points on the user interface based on the vertex colored graphic and the size of the vertex filleted corner of the mask comprises:
    determining, based on the vertex colored graphic, whether the remaining to-be-rendered pixel points are outside a region of the mask;
    if a to-be-rendered pixel point i is not outside the region of the mask, determining whether the to-be-rendered pixel point i is outside a region of the vertex filleted corner of the mask, wherein the to-be-rendered pixel point i is any one of the remaining to-be-rendered pixel points, wherein i=1, . . . , n, and n is an integer, and wherein n is determined according to a number of the remaining to-be-rendered pixel points; and
    if the to-be-rendered pixel point i is not outside the region of the vertex filleted corner of the mask, outputting an original color of the to-be-rendered pixel point i on the user interface.

5. The method according to claim 4, wherein after determining whether the remaining to-be-rendered pixel points are outside the region of the mask, the method further comprises:
    if the to-be-rendered pixel point i is outside the region of the mask, skipping coloring the to-be-rendered pixel point i or outputting the to-be-rendered pixel point i with a fully transparent color on the user interface.

6. The method according to claim 4, wherein determining whether the remaining to-be-rendered pixel points are outside the region of the mask comprises:
    obtaining a two-dimensional coordinate of the to-be-rendered pixel point i according to a two-dimensional projection and rasterization of the to-be-rendered vertex; and
    determining, based on the two-dimensional coordinate of the to-be-rendered pixel point i, whether the to-be-rendered pixel point i is outside the region of the mask.

7. The method according to claim 4, wherein after determining whether the to-be-rendered pixel point i is outside the region of the vertex filleted corner of the mask, the method further comprises:
    if the to-be-rendered pixel point i is outside the region of the vertex filleted corner of the mask, skipping coloring the to-be-rendered pixel point i or outputting the to-be-rendered pixel point i with a fully transparent color on the user interface.

8. The method according to claim 4, wherein the graphic comprises four filleted corners and the mask is a rectangular mask which covers the border of the graphic; and
wherein determining whether the to-be-rendered pixel point i is outside the region of the vertex filleted corner of the mask comprises:
obtaining a two-dimensional coordinate of the to-be-rendered pixel point i according to a two-dimensional projection and rasterization of the to-be-rendered vertex;
determining, based on the two-dimensional coordinate of the to-be-rendered pixel point i, a vertex filleted corner of the mask at a closest distance to the to-be-rendered pixel point i;
calculating a circle center and an enclosing rectangle of the vertex filleted corner of the mask at the closest distance to the to-be-rendered pixel point i; and
determining whether the to-be-rendered pixel point i is outside the region of the vertex filleted corner of the mask, according to the circle center, the enclosing rectangle and the two-dimensional coordinate of the to-be-rendered pixel point i.

9. The method according to claim 1, wherein in response to the progress value of the graphic, determining the offset value and the size of the vertex filleted corner of the mask corresponding to the graphic comprises:
acquiring a length of the graphic;
calculating a product of the length and the progress value, and determining the calculated product as an offset value of the mask relative to a central point of the graphic; and
determining, according to the progress value and the offset value, a size of a vertex filleted corner at which the mask intersects with the graphic.

10. The method according to claim 9, wherein determining, according to the progress value and the offset value, the size of the vertex filleted corner at which the mask intersects with the graphic comprises:
determining, according to the progress value and a size of the border of the graphic, a length of a progress line of the graphic; and
determining, based on the length of the progress line and the offset value, the size of the vertex filleted corner at which the mask intersects with the graphic.

11. A graphics rendering apparatus, comprising:
at least one processor; and
a memory communicatively connected to the at least one processor; wherein
the memory stores instructions executable by the at least one processor, and the instructions are executed by the at least one processor, so that the at least one processor is configured to:
display a graphic on a user interface, wherein the graphic comprises one or more vertex filleted corners;
in response to a progress value of the graphic, determine an offset value and a size of a vertex filleted corner of a mask corresponding to the graphic, wherein the mask covers a border of the graphic; and
render the graphic on the user interface based on the offset value and the size of the vertex filleted corner of the mask.

12. The apparatus according to claim 11, wherein the at least one processor is configured to:

perform vertex coloring on the graphic on the user interface based on the offset value of the mask, and perform fragment coloring on remaining to-be-rendered pixel points on the user interface based on the vertex colored graphic and the size of the vertex filleted corner of the mask.

13. The apparatus according to claim 12, wherein the at least one processor is configured to:
convert a three-dimensional position of a to-be-rendered vertex from local space to mask space, based on a three-dimensional pose of a node of the mask in world space; and
perform the vertex coloring on the graphic on the user interface according to the converted three-dimensional position and the offset value of the mask.

14. The apparatus according to claim 12, wherein the at least one processor is configured to:
determine, based on the vertex colored graphic, whether the remaining to-be-rendered pixel points are outside a region of the mask;
if a to-be-rendered pixel point i is not outside the region of the mask, determine whether the to-be-rendered pixel point i is outside a region of the vertex filleted corner of the mask, wherein the to-be-rendered pixel point i is any one of the remaining to-be-rendered pixel points, wherein i=1, . . . , n, and n is an integer, and wherein n is determined according to a number of the remaining to-be-rendered pixel points; and
if the to-be-rendered pixel point i is not outside the region of the vertex filleted corner of the mask, output an original color of the to-be-rendered pixel point i on the user interface.

15. The apparatus according to claim 14, wherein the at least one processor is configured to:
if the to-be-rendered pixel point i is outside the region of the mask, skip coloring the to-be-rendered pixel point i or output the to-be-rendered pixel point i with a fully transparent color on the user interface.

16. The apparatus according to claim 14, wherein the at least one processor is configured to:
obtain a two-dimensional coordinate of the to-be-rendered pixel point I according to a two-dimensional projection and rasterization of the to-be-rendered vertex; and
determine, based on the two-dimensional coordinate of the to-be-rendered pixel point i, whether the to-be-rendered pixel point i is outside the region of the mask.

17. The apparatus according to claim 14, wherein the at least one processor is configured to:
if the to-be-rendered pixel point i is outside the region of the vertex filleted corner of the mask, skip coloring the to-be-rendered pixel point i or output the to-be-rendered pixel point i with a fully transparent color on the user interface.

18. The apparatus according to claim 14, wherein the graphic comprises four filleted corners and the mask is a rectangular mask which covers the border of the graphic; and
wherein the at least one processor is configured to:
obtain a two-dimensional coordinate of the to-be-rendered pixel point i according to a two-dimensional projection and rasterization of the to-be-rendered vertex;
determine, based on the two-dimensional coordinate of the to-be-rendered pixel point i, a vertex filleted corner of the mask at a closest distance to the to-be-rendered pixel point i;

calculate a circle center and an enclosing rectangle of the vertex filleted corner of the mask at the closest distance to the to-be-rendered pixel point i; and determine whether the to-be-rendered pixel point i is outside the region of the vertex filleted corner of the mask, according to the circle center, the enclosing rectangle and the two-dimensional coordinate of the to-be-rendered pixel point i.

19. The apparatus according to claim 11, wherein the at least one processor is configured to:

acquire a length of the graphic;

calculate a product of the length and the progress value, and determine the calculated product as an offset value of the mask relative to a central point of the graphic; and determine, according to the progress value and the offset value, a size of a vertex filleted corner at which the mask intersects with the graphic.

20. A non-transitory computer-readable storage medium, the computer-readable storage medium having a computer program stored thereon, and the computer program causing a server to execute steps of:

displaying a graphic on a user interface, wherein the graphic comprises one or more vertex filleted corners;

in response to a progress value of the graphic, determining an offset value and a size of a vertex filleted corner of a mask corresponding to the graphic, wherein the mask covers a border of the graphic; and rendering the graphic on the user interface based on the offset value and the size of the vertex filleted corner of the mask.

* * * * *